US012693927B2

(12) United States Patent

Mariacher et al.

(10) Patent No.: US 12,693,927 B2
(45) Date of Patent: Jul. 28, 2026

(54) METHOD FOR DEVICE DIAGNOSTICS

(71) Applicant: Philip Morris Products S.A.,
Neuchatel (CH)

(72) Inventors: Eric Mariacher, Jougne (FR); Maxime Chateau, Montlebon (FR)

(73) Assignee: Philip Morris Products S.A.,
Neuchatel (CH)

( * ) Notice: Subject to any disclaimer, the term of this patent is extended or adjusted under 35 U.S.C. 154(b) by 566 days.

(21) Appl. No.: 18/261,429

(22) PCT Filed: Jan. 20, 2022

(86) PCT No.: PCT/EP2022/051277
§ 371 (c)(1),
(2) Date: Jul. 13, 2023

(87) PCT Pub. No.: WO2022/157267
PCT Pub. Date: Jul. 28, 2022

(65) Prior Publication Data
US 2024/0054042 A1 Feb. 15, 2024

(30) Foreign Application Priority Data

Jan. 20, 2021 (EP) ..................................... 21152562

(51) Int. Cl.
*G06F 11/07* (2006.01)
*A24F 40/53* (2020.01)
*A24F 40/65* (2020.01)
*A24F 40/90* (2020.01)
*H04B 5/20* (2024.01)

(52) U.S. Cl.
CPC .......... *G06F 11/0787* (2013.01); *A24F 40/53* (2020.01); *A24F 40/65* (2020.01);
(Continued)

(58) Field of Classification Search
CPC ............. G06F 11/0787; G06F 11/0736; G06F 11/0778; A24F 40/53; A24F 40/65;
(Continued)

(56) References Cited

U.S. PATENT DOCUMENTS

2006/0106577 A1 5/2006 Hatakeyama
2017/0027234 A1 2/2017 Farine et al.
(Continued)

FOREIGN PATENT DOCUMENTS

JP 2006-127324 A 5/2006
JP 2019-513061 A 5/2019
(Continued)

OTHER PUBLICATIONS

Russian Office Action issued Oct. 8, 2025 in Russian Patent Application No. 2023121667/28 (with English Translation), 12 pages.
(Continued)

*Primary Examiner* — Robert G Bachner
(74) *Attorney, Agent, or Firm* — Oblon, McClelland, Maier & Neustadt, L.L.P.

(57) ABSTRACT

A system is provided, including: an aerosol-generating device and/or a charging device associated with an aerosol-generating device; a near-field communication module including a nonvolatile memory; and a controller configured to receive an indication of an error occurrence and to update an error data log stored in the nonvolatile memory by storing an error data entry associated with the error occurrence to the error data log, the error data entry being configured to be read by an external device even when the aerosol-generating device and/or the charging device including the near-field communication module is not powered. A method for maintaining error data on an aerosol-generating device and/or a charging device associated with an aerosol-generating
(Continued)

device is also provided. A method for recovery of error data from an aerosol-generating device and/or a charging device associated with an aerosol-generating device is also provided.

23 Claims, 7 Drawing Sheets

(52) U.S. Cl.
CPC .......... *A24F 40/90* (2020.01); *G06F 11/0736* (2013.01); *H04B 5/20* (2024.01)

(58) Field of Classification Search
CPC .......... A24F 40/90; A24F 40/20; H04B 5/20; H04W 4/80
See application file for complete search history.

(56) References Cited

U.S. PATENT DOCUMENTS

| | | |
|---|---|---|
| 2017/0097864 A1 | 4/2017 | Seigel et al. |
| 2018/0232272 A1 | 8/2018 | Seigel et al. |
| 2020/0000143 A1 | 1/2020 | Anderson et al. |

FOREIGN PATENT DOCUMENTS

| | | |
|---|---|---|
| JP | 2019-521739 A | 8/2019 |
| RU | 2016 146 735 A | 5/2018 |
| RU | 2 734 714 C1 | 10/2020 |
| WO | WO 2017/172781 A1 | 10/2017 |
| WO | WO 2017/205692 A1 | 11/2017 |
| WO | WO 2021/260089 A1 | 12/2021 |

OTHER PUBLICATIONS

"NFC: Near Field Communication Technology Breakdown", HABR, retrieved from https://habr.com/ru/companies/droider/articles/504198/, May 28, 2020, 37 pages.

Japanese Office Action issued Oct. 2, 2025 in Japanese Patent Application No. 2023-543152 with English annotations, 3 pgs.

Combined Russian Office Action and Search Report issued Jun. 25, 2025, in corresponding Russian Patent Application No. 2023121667/28(047394) (with English Translation and English Translation of Category of Cited Documents), 16 pages.

International Search Report issued May 6, 2022 in PCT/EP2022/051277, 4 pages.

Mena, "RF430FRL152H Novel Ferroelectric RAM Memory (FRAM) MFC Embedded Tag Based Sensors", Texas Instruments, Dec. 2012, pp. 1-6, XP:055907672.

600

METHOD FOR DEVICE DIAGNOSTICS

This disclosure relates to diagnostics of portable electronic devices, more particularly to devices such as aerosol-generating devices and charging devices associated with aerosol-generating devices that contain a dynamic near-field communication tag.

Electronic devices can generate error logs containing diagnostic information on detected issues such as error conditions. Such error logs stored on the electronic device are employed for device diagnostics to trace causes for malfunctions of the device. Such solutions support maintenance of the device. Portable electronic devices, such as aerosol-generating devices, being carried along with the user's daily activities, encounter substantial damage risks, e.g. due to mechanical stresses in being dropped on a street, or due to contact with water on a rainy day. As a consequence, components of the portable electronic device may be unrecoverable, barring access to the error log stored on the device. In other cases, components of a portable electronic device may be broken because components of the device have been replaced by unsuitable components. In such cases, the error log provides insight on why the device is broken but is not available because the error log is unreadable without power supply to the electronic device, or because the electronic device is inoperable.

According to an aspect of the present invention, a system comprising a device is provided. The system comprises a near-field communication module comprising a non-volatile memory, a control unit configured to receive an indication of an error occurrence and update an error data log stored in the non-volatile memory by storing an error data entry associated with said error occurrence to the error data log. The error data entry is configured to be read by an external device even when the device is not powered. The device may be an aerosol-generating device or a charging device associated with an aerosol-generating device.

Hence, according to the disclosed invention, a control unit dynamically updates content of data stored in a near field communication module with error data entries. Because near-field communication modules, as compared to other electronic components of the device, are relatively robust against environmental damage, the invention provides for robust storage of error logs. Further, because near field communication modules take up energy from an external device that is reading the near-field communication module, the error data entry can be read out even from completely broken devices. The present invention hence provides for robust storage of error logs.

The near-field communication module may be a near-field communication tag. The system may also comprise a near-field communication controller. The control unit updating the error data log may comprise the control unit transmitting the error data entry to the near-field communication controller. The near-field communication controller may be configured to then store the received error data entry to the error data log.

The non-volatile memory may comprise a near-field communication data exchange format record configured for including at least one, or both, of a: Uniform Resource Locator and a near-field communication data exchange format record configured for including configuration data for Bluetooth low energy pairing.

Storing the error data entry to the error data log may comprise storing the error data entry in association with an error type and a timestamp. Storing the error data entry to the error data log may comprise storing the error data entry in association with identifying information of the device.

The charging device may comprise the near-field communication module and the control unit. The control unit may be configured to detect that the charging device has received and/or has been connected to an associated aerosol-generating device and in response retrieve an error data log associated to at least one error occurrences of the aerosol-generating device. The control unit may then update the error data log with the error data log associated to the at least one error occurrences of the aerosol-generating device.

The system may comprise the aerosol-generating device, wherein the aerosol-generating device is configured to detect at least one error occurrence on the aerosol-generating device. The aerosol-generating device may be configured to update the error data log associated to at least one error occurrence of the aerosol-generating device stored in volatile memory by storing an error data entry associated with the at least one error occurrence on the aerosol-generating device to the error data log associated to at least one error occurrence of the aerosol-generating device.

The control unit may further be configured to encrypt the error data log.

In another aspect, a method for maintaining error data on a device is disclosed. The method comprises monitoring the device for error occurrences, and in response to detecting an error occurrence, updating an error data log stored in non-volatile memory of a near-field communication module of device by storing an error data entry associated to the error occurrence to the error data log. The method further comprises transmitting, via near-field communication, the error data log to an external device for diagnostics.

Because near field communication modules are relatively robust under mechanical and chemical stresses, the disclosed method allows for error log storage with improved robustness against environmental damage. The near-field communication module also provides reliable access to the error log, as external devices reading the near-field communication module provide energy to activate circuitry of the near-field communication module.

Updating the error data log may comprise transmitting the error data entry to a near-field communication controller for storing the received error data entry to the error data log. Monitoring the aerosol-generating device or the charging device for error occurrences may comprise monitoring the device for error occurrences corresponding to a plurality of error conditions.

The method may comprise, in response to a charging device receiving and/or being connected to an associated aerosol-generating device, retrieving an error data log associated to at least one error occurrence of the aerosol-generating device, and updating the error data log with the error data log associated to the at least one error occurrences of the aerosol-generating device. The method may further comprise encrypting the error data log.

According to another aspect of the present invention, a method for recovery of error data from a device is disclosed. The method discloses displaying, on a user interface of the external device, a prompt to move the external device in proximity to the aerosol-generating device and/or the charging device. The method further comprises, in response to detecting that the external device is in proximity to the aerosol-generating device or the charging device, retrieving, via near-field communication, an error data log from non-volatile memory of a near-field communication module of the device, and displaying error data entries from the error data log on the user interface.

By allowing near-field communication access to an error log, the present invention provides for a method of quick analysis of a device without requiring disassembling the device. In particular, the present invention allows retrieving the error data log even though the device's main circuits and power supply is nonfunctional.

As used herein, the term "aerosol-generating device" refers to a device that interacts with an aerosol-forming substrate to generate an aerosol. An aerosol-generating device may interact with one or both of an aerosol-generating article comprising an aerosol-forming substrate, and a capsule comprising an aerosol-forming substrate. In some examples, the aerosol-generating device may heat the aerosol-forming substrate to facilitate release of volatile compounds from the substrate. An electrically operated aerosol-generating device may comprise an atomizer, such as an electric heater, to heat the aerosol-forming substrate to form an aerosol.

As used herein, the term "aerosol-forming substrate" refers to a substrate capable of releasing volatile compounds that can form an aerosol. The volatile compounds may be released by heating or combusting the aerosol-forming substrate. As an alternative to heating or combustion, in some cases, volatile compounds may be released by a chemical reaction or by a mechanical stimulus, such as ultrasound. The aerosol-forming substrate may be solid or liquid or may comprise both solid and liquid components. An aerosol-forming substrate may be part of an aerosol-generating article.

The invention is defined in the claims. However, a non-exhaustive list of non-limiting examples is provided below. Any one or more of the features of these examples may be combined with any one or more features of another example, embodiment or aspect described herein.

Example Ex1: A system comprising an aerosol-generating device and/or a charging device associated with an aerosol-generating device, the system comprising a near-field communication module comprising a non-volatile memory; a control unit configured to receive an indication of an error occurrence and update an error data log stored in the non-volatile memory by storing an error data entry associated with said error occurrence to the error data log, wherein the error data entry is configured to be read by an external device even when the device comprising the near-field communication module is not powered.

Example Ex2: The system according to Ex1, wherein the near-field communication module is a near-field communication tag.

Example Ex3: The system according to example Ex1 or example Ex2, wherein the aerosol-generating device and/or charging device includes a battery or a connection to an external power supply providing power to the control unit and the near-field communication module, wherein the device not powered comprises the battery or the connection to an external power supply not providing power to the control unit and the near-field communication module.

Example Ex4: The system according to example Ex2, wherein the near-field communication tag is configured to be read by the external device according to a near-field communication protocol.

Example Ex5: The system according to any of the preceding examples, wherein the system comprises a near-field communication controller, wherein the control unit updating the error data log comprises the control unit transmitting the error data entry to the near-field communication controller, and wherein the near-field communication controller is configured to store the received error data entry to the error data log.

Example Ex6: The system according to any of the preceding examples, wherein the control unit is configured to receive the indication of an error occurrence by being configured to monitor for a plurality of error conditions.

Example Ex7: The system according to any of the preceding examples, wherein the device comprising the near-field communication module is the aerosol-generating device or the charging device associated with an aerosol-generating device.

Example Ex8: The system according to any of the preceding examples, wherein the error data log is stored in the non-volatile memory as raw data and/or wherein the error data log is stored in the non-volatile memory as a ring buffer.

Example Ex9: The system according to any of the preceding examples, wherein the error data log has a size of 256 bytes.

Example Ex10: The system according to any of the preceding examples, wherein the non-volatile memory further comprises a near-field communication data exchange format record configured for including identifying information of tobacco products.

Example Ex11: The system according to any of the preceding examples, wherein the non-volatile memory further comprises a near-field communication data exchange format record configured for including a at least one, or both, of a: Uniform Resource Locator and a near-field communication data exchange format record configured for including configuration data for Bluetooth low energy pairing.

Example Ex12: The system according to any of the preceding examples, wherein storing the error data entry to the error data log comprises storing the error data entry in association with an error type and a timestamp.

Example Ex13: The system according to any of the preceding examples, wherein storing the error data entry to the error data log comprises storing the error data entry in association with identifying information of the aerosol-generating device and/or the charging device.

Example Ex14: The system according to example Ex13, wherein the identifying information of the aerosol-generating device comprises at least one of a product code, a device serial number, and a manufacturing site code.

Example Ex15: The system according to any of the preceding examples, wherein the control unit is configured to filter the error data entry before storing the error data entry to the error log. Example Ex16: The system according to any of the preceding examples, wherein the near-field communication module is configured to transmit, to the control unit, an indication that an external device is currently reading the non-volatile memory.

Example Ex17: The system according to example Ex16, wherein the control unit is further configured to, in response receiving the indication that the external device is currently reading the non-volatile memory, refrain from writing the error data entry.

Example Ex18: The system according to any of the preceding examples, wherein the charging device comprises the near-field communication module and the control unit.

Example Ex19: The system according to example Ex18, wherein the control unit is configured to receive the indication of an error occurrence by being configured to monitor the charging device for a plurality of charging device error conditions.

Example Ex20: The system according to example Ex19, wherein the plurality of charging device error conditions comprises a battery replacement error.

Example Ex21: The system according to any of the preceding examples, wherein the control unit is configured to, in response to the charging device receiving or being connected to the associated aerosol-generating device, retrieve an error data log associated to at least one error occurrence of the aerosol-generating device, and update the error data log with the error data log associated to at least one error occurrences of the aerosol-generating device.

Example Ex22: The system according to example Ex21, wherein updating the error data log with the error data log associated to at least one error occurrence of the aerosol-generating device comprises storing error data entries from the error data log associated to at least one error occurrence of the aerosol-generating device in association with a serial number of the aerosol-generating device.

Example Ex23: The system according to example Ex21 or example Ex22, wherein the control unit is configured to update the error data log only with error data entries from the error data log associated to error occurrences of the aerosol-generating device which are currently not stored in the error data log.

Example Ex24: The system according to any of examples Ex21 to Ex23, wherein the system further comprises the aerosol-generating device, wherein the aerosol-generating device is configured to detect an at least one error occurrences on the aerosol-generating device and update the error data log associated to at least one error occurrences of the aerosol-generating device stored in volatile memory by storing an error data entry associated with the at least one error occurrence on the aerosol-generating device to the error data log associated to at least one error occurrences of the aerosol-generating device.

Example Ex25: The system according to any of examples Ex1 to Ex17, wherein the aerosol-generating device comprises the near-field communication module and the control unit.

Example Ex26: The system according to example Ex22 or example Ex25, wherein the error occurrence is a coil replacement error or a battery replacement error.

Example Ex27: The system according to any of examples Ex1 to Ex26, wherein the control unit is further configured to encrypt the error data log.

Example Ex28: The system according to any of the preceding examples, further comprising the external device for diagnostics of the aerosol-generating device or the charging device associated with the aerosol-generating device, wherein the external device is configured to, in response to determining that the non-volatile memory corresponds to a non-volatile memory of the aerosol-generating device or the charging device associated with the aerosol-generating device, retrieve the error data log from the non-volatile memory via near-field communication.

Example Ex29: The system according to example Ex28, wherein the external device is further configured to decode the error data log, sort the decoded error data log, and display the decoded error log on a user interface.

Example Ex30: A method for maintaining error data on an aerosol-generating device and/or a charging device associated with an aerosol-generating device, the method comprising monitoring the aerosol-generating device and/or the charging device for error occurrences; in response to an error occurrence, updating an error data log stored in non-volatile memory of a near-field communication module of the aerosol-generating device and/or the charging device by storing an error data entry associated to the error occurrence to the error data log; and transmitting, via near-field communication, the error data log to an external device for diagnostics.

Example Ex31: The method of example Ex30, wherein the near-field communication module is a near-field communication tag.

Example Ex32: The method according to example Ex30 or example Ex31, wherein the updating the error data log comprises transmitting the error data entry to a near-field communication controller for storing the received error data entry to the error data log.

Example Ex33: The method according to any of examples Ex30 to Ex32, wherein the monitoring the aerosol-generating device and/or the charging device for error occurrences comprises monitoring the device for error occurrences for a plurality of error conditions.

Example Ex34: The method according to any of examples Ex30 to Ex33, wherein the storing the error data entry to the error data log comprises storing the error data entry to the error data log as raw data.

Example Ex35: The method according to any of examples Ex30 to Ex34, wherein the error data log is stored in the non-volatile memory as a ring buffer.

Example Ex36: The method according to any of examples Ex30 to Ex35, further comprising storing in the non-volatile memory a near-field communication data exchange format record configured for including identifying information of tobacco products.

Example Ex37: The method according to any of any of examples Ex30 to Ex36, further comprising storing in the non-volatile memory a near-field communication data exchange format record configured for including at least one, or both, of a: Uniform Resource Locator and a near-field communication data exchange format record relating to configuration data for Bluetooth low energy pairing.

Example Ex38: The method according to any of examples Ex30 to Ex37, wherein the storing the error data entry to the error data log comprises storing the error data entry in association with an error type and a timestamp.

Example Ex39: The method according to any of examples Ex30 to Ex38, wherein the storing the error data entry to the error data log comprises storing the error data entry in association with identifying information of the aerosol-generating device.

Example Ex40: The method according to example Ex39, wherein the identifying information of the aerosol-generating device comprises at least one of a product code, a device serial number, and a manufacturing site code.

Example Ex41: The method according to any of examples Ex30 to Ex40, further comprising filtering the error data entry before storing the error data entry to the error log.

Example Ex42: The method according to any of examples Ex30 to Ex40, further comprising receiving an indication that an external device is currently reading the error data log.

Example Ex43: The method according to any of examples Ex30 to Ex42, wherein the plurality of charging device error conditions comprises a battery replacement error.

Example Ex44: The method according to any of examples Ex30 to Ex42, further comprising, in response to the charging device receiving the associated aerosol-generating device, retrieving an error data log associated to at least one error occurrence of the aerosol-generating device, and updating the error data log with the error data log associated to the at least one error occurrences of the aerosol-generating device.

Example Ex45: The method according to example Ex44, wherein updating the error data log with the error data log associated to error occurrences of the aerosol-generating device comprises storing error data entries from the error data log associated to tat least one error occurrence of the aerosol-generating device in association with a serial number of the aerosol-generating device.

Example Ex46: The method according to example Ex44 or example Ex45, wherein the updating the error data log with the error data log associated to the at least one error occurrences of the aerosol-generating device comprises updating the error data log only with error data entries from the error data log associated to error occurrences of the aerosol-generating device which are currently not stored in the error data log.

Example Ex47: The method according to any of examples Ex44 to Ex46, further comprising detecting at least one error occurrence on the aerosol-generating device and updating the error data log associated to at least one error occurrence of the aerosol-generating device stored in volatile memory by storing an error data entry associated with the at least one error occurrence on the aerosol-generating device to the error data log associated to at least one error occurrences of the aerosol-generating device.

Example Ex48: The system according to example Ex47, wherein the error occurrence is a coil replacement error or a battery replacement error.

Example Ex49: The method according to any of examples Ex30 to Ex48, further comprising encrypting the error data log.

Example Ex50: A method for recovery of error data from an aerosol-generating device and/or a charging device associated with an aerosol-generating device, the method comprising displaying, on a user interface of the external device, a prompt to move the external device in proximity to the device; in response to detecting that the external device is in proximity to the device, retrieving, via near-field communication, an error data log from non-volatile memory of a near-field communication module of the device; and displaying error data entries from the error data log on the user interface.

Example Ex51: The method according to example Ex50, wherein retrieving the error data log comprises decoding the error data entries from the error data log.

Example Ex52: The method according to example Ex50 or example Ex51, further comprising decrypting the error data entries.

Example Ex53: The method according to any of examples Ex50 to Ex52, further comprising sorting the error data entries, and wherein displaying the error data entries comprises displaying a sorted list of error data entries.

Examples will now be further described with reference to the figures, in which

Figure 1A:
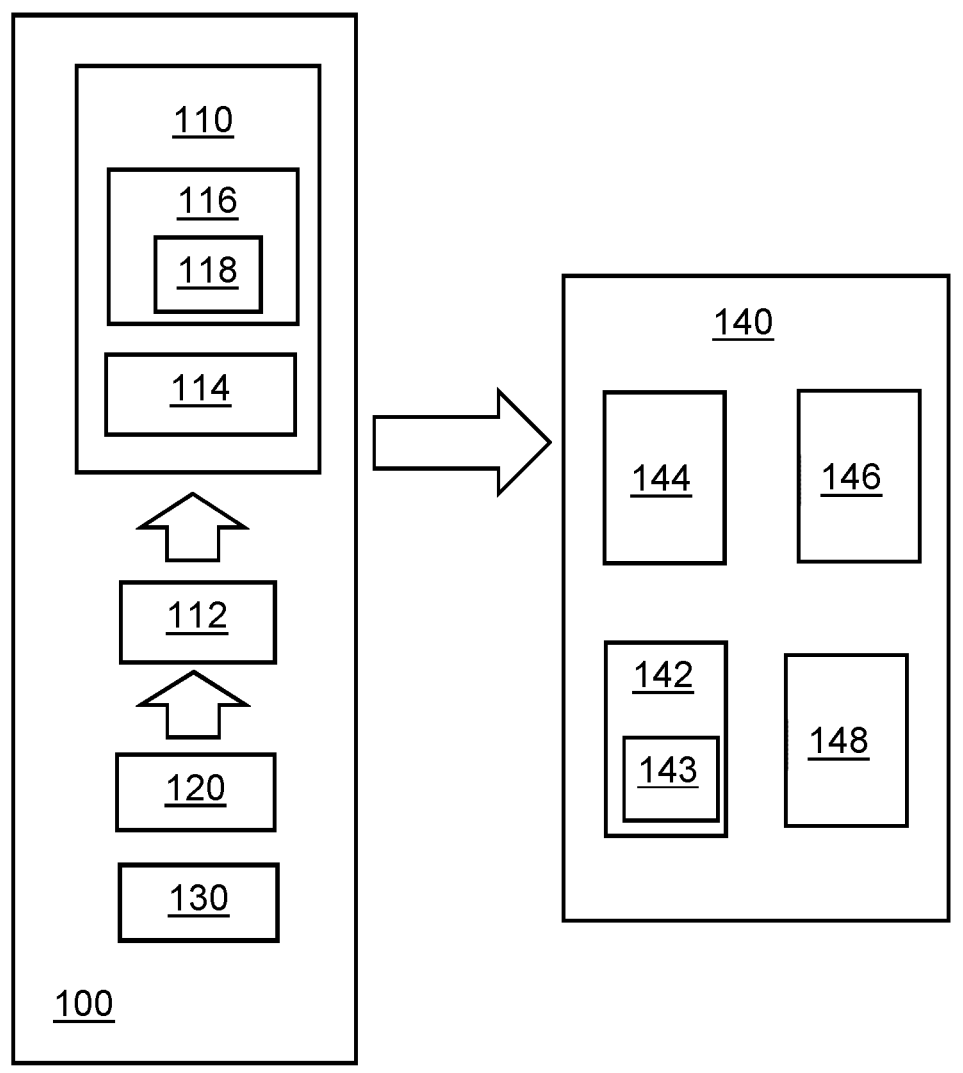
FIG. 1A illustrates a system comprising a device equipped with a near-field communication module for device diagnostics.

FIG. 1A illustrates a system comprising device 100 and an external device 140, wherein the external device 140 is configured for reading an error log stored in near field communication module 110 of device 100. Device 100 may be an aerosol-generating device or a charging device associated with an aerosol-generating device, as will be described in further detail below. Device 100 is controlled by control unit 120. Device 100 comprises communication module 130, control unit 120 and near-field communication module 110. Control unit 120 may be configured to receive indications of error occurrences. Control unit 120 may be configured to monitor components of device 100 for a plurality of error conditions. In response to receiving an indication of an occurrence of an error, control unit 120 may receive or generate data associated with the error occurrence. In FIG. 1A, arrows indicate data flow of data related to error conditions.

For example, an error occurrence may be replacement of a battery of device 100. The indication of an occurrence of an error may indicate insertion of an unsuitable battery with battery characteristics that entail a risk of malfunctioning of device 100. For example, the unsuitable battery may have a wrong voltage, a wrong capacity, or a wrong discharge curve. Another error occurrence may be associated with replacement of a coil used for generating an aerosol from an aerosol-generating article. Replacement of the coil may also pose a risk to safety of operation of the aerosol-generating device. Hence, control unit 120 may receive an indication that the coil has been replaced.

Upon detection of an error occurrence, control unit 120 is configured to update error data log 118 stored in non-volatile memory 116 of near field communication module 110 by storing data related to the occurred error to error data log 118. Error data log 118 may be configured as a ring buffer such that a fixed number of error data entries are kept and older data entries are overwritten by newer error data entries. The configuration of data error log 118 will be described in further detail below. Non-volatile memory 116 may further store dynamic data related to improving user experience by logging onto a product website or providing Bluetooth low energy pairing of device 100 to external device 140, as has been disclosed in European Patent Application No. 20 182 038.8.

In more detail, control unit 120 may be a microcontroller unit. Storing the error data entry associated with the indicated error occurrence to the error data log may, in further detail, comprise control unit 120 communicating with near field communication controller 112, for example employing communication protocol 120. Near-field communication controller 112 may be configured to receive the error data entry from control unit 120 and write the error data entry to error data log 118. Specifically, control unit 120 instructs near-field communication controller 112 to write the error data entry to a specific address of non-volatile memory 116.

Hence, control unit 120 dynamically updates content of data stored in a near field communication module 110. Communication of control unit 120 with near-field communication controller 112 hence allows read-and-write access of control unit 120 to non-volatile memory 116. Near-field communication module 110 comprises antenna 114 which is configured for being read by external device 140, for example according to a near field communication protocol or other radio frequency identification technologies. Near field communication protocol or other radio frequency identification technologies involve that the near-field communication module is provided power from external device 140. In particular, power provided to near-field communication module 110 from external device 140 allows communication between near-field communication module 110 and external device 140 without the near-field communication module being connected to a power source of device 100. In particular, communication between near-field communication module 110 and external device 140 also does not involve control unit 120 or communication ports such as USB ports which are prone to damage. Therefore, external device 140 may read non-volatile memory 116 also in cases where device 100 is uncharged or broken.

External device 140 may be a mobile terminal such as a mobile phone, smartphone, computer laptop, table computer or personal digital assistant. External device 140 comprises near-field communication reader circuitry 144, memory 142 storing software instructions 143, communication module 146, and processor 148. External device 140, performing software instructions 143 employing processor 148, may receive a message from near-field communication module 110 when near-field communication reader circuitry 144 of external device 140 is activated and distance between external device 144 and near-field communication module 110 is within a range allowing near-field communication. Then, near-field communication reader circuitry 144 may receive data stored in non-volatile memory 116 comprising error data log 118 and structured data records 117 such as data related to a website Uniform Resource Locator and Bluetooth low energy pairing.

Control unit 120 may send a request to near-field communication controller 112 on whether an external device, such as device 140, is currently reading non-volatile memory 116. If near-field communication controller 112 indicates that an external device is currently reading non-volatile memory 116, control unit 120 may be configured to refrain from instructing near-field communication controller 112 to update error data log 118 with new error data entries, to avoid creating data inconsistencies.

Near-field communication module 110 may hence allow read-only access to non-volatile memory 116 by external device 140. However, in other examples, near-field communication module 110 may also be configured to allow read-and-write access to non-volatile memory 116 by external device 140.

Figure 1B:
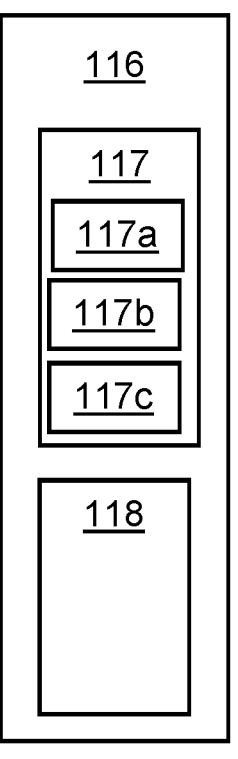
FIG. 1B illustrates non-volatile storage maintained on a near-field communication module for device diagnostics.

FIG. 1B illustrates a block diagram of the structure of non-volatile memory 116. In addition to error data log 118, non-volatile memory comprises list 117 of structured data records 117a, 117b, 117c. The format of error data log 118 may be different from a format of structured data records 117a, 117b, 117c. The format of error data log 118 may be raw data. Raw data corresponds to data lacking any standard data format, so that external readers cannot understand meaning and purpose of the data. To further enhance information security, error data log 118 may be encrypted. In particular, raw data will be provided to a dedicated application on the external device without pre-processing, so that the dedicated application may be configured to decode the error data log according to a predefined custom structure. The format of structured data records 117a, 117b, 117c may be near-field communication Data Exchange format records.

Table 1 gives a specific example for the structure configuration of non-volatile memory 116. Non-volatile memory 116 may be an EEPROM comprising Areal, which may correspond to correspond to list of list of records 117, and Area 2 for storing error data log 118 as raw memory.

TABLE 1

| | Format | Content | Address boundaries | Size |
|---|---|---|---|---|
| Area 1 | Near-field communication Data Exchange format records | List of records | 0000h-00FFh | 256 bytes |
| Area 2 | Raw memory | Error data log | 0100h-01FFh | 256 bytes |

Error data log 118 may contain an index of the error data entry corresponding to a sequential number of the error that is logged. A first error logged receives an index of 1.

Error data log 118 may further be employed for storing an error type, a product code of device 100, which is usually part of the serial code of the device. The product code identifies what kind of device 100 is, such as whether it is a charger or a holder. Error data log 118 may also indicate a unique device identifier. Hence, two different holder devices have the same product code, but different device numbers. Error data log 118 may also contain a site code which identifies where the device was manufactured.

Error data log 118 may further contain a timestamp which identifies the date when the recorded error is detected, for example the date at which the battery of device 100 was replaced. The date when the recorded error is detected may correspond to a date and time according recorded when control unit 120 received indication of the error occurrence.

Hence, error data log 118 may comprise comprehensive information on the error occurrence to allow reliable device diagnostics.

In particular, in the example of Table 1, the size of memory dedicated to area 2 corresponding to error data log 118 is 256 bytes, so that error data log 118 allows the storage of 16 error data entries.

In the following, list of records 117 will be described in more detail. When transferred to external device 140, list of records 117 may configure external device to perform a particular action. List of records 117 may comprise an NDEF record containing a URL of a website which may be employed by external device 140 to navigate to the specified website to improve user experience. List of records 117 may further comprise an NDEF record including configuration data for Bluetooth low energy pairing, which may be employed to establish Bluetooth communication between device 100 and external device 140. List of records 117 may also comprise NDEF records configured for including identifying information of tobacco products such as a Codentify string.

List of records 117 comprises at least two records arranged in a list.

The list of records 117 corresponds to a message that comprises a list of three records: a first record 117a, a second record 117b, and a third record 117c. At least the first record 117a and the second record 117b are each of a different record type. Accordingly, at least the first record 117a and the second record 117b are each associated with a different operation to be executed by the external device 140.

The third record 117c may be of a text type. The third record 117c may comprise an identification number, for example the serial number of the device 100. The identification number may be used, for example, during manufacturing of the device or during other processes requiring the device to be identified.

When the external device 140 is positioned in proximity to the device 100, the near-field communication module 110 sends the message 117 to the external device 140. In other words, the external device 140 receives the message 117 from the near-field communication module 110 when the distance between the external device 140 and the near-field communication module 110 is below a threshold distance.

The order of the records in the list defines which operation will be automatically executed by the software instructions 143 of the external device 140 because the software instructions 143 automatically execute the operation associated with the record that is at the top of the list. In other words, the order of the first record 117a and the second record 117b in the list defines whether an operation associated with the first record 117a or an operation associated with the second record 117b is to be automatically executed by the external device 140.

For example, FIG. 1B shows that the first record 117a is first in the list meaning that the first record 117a is at the top of the list. The second record 117b is second in the list meaning that the second record 117b in the middle of the list. The third record 117c is third in the list meaning that the third record 117c at the bottom of the list. However, it is to be appreciated that the records 117a, 117b and 117c may be arranged in any order. Specifically, as will be explained in more detail below, the order of the records in the list is based at least in part on detection of a predetermined status of the device 100. Accordingly, the operation automatically executed by the external device 140 depends at least in part on the status of the device 100.

Therefore, in response to receiving the message 117, the application and/or operating system software 143 installed on the external device 140 executes the record that is first in the list (in other words, at the top of the list) of records. The external device 140 then performs an operation associated with the executed record. Thus, if the first record 117a is first in the list as illustrated in FIG. 1B, the external device 140 automatically executes an operation associated with the first record 117a. The operations associated with the second record 117b and the third record 117c are not executed automatically. If the second record 117b is first in the list, the external device 140 automatically executes an operation associated with the second record 117b. The operations associated with the first record 117a and the third record 117c are not executed automatically.

The near-field communication module 110 is configured such that the content written to and stored by the near-field communication module 110 during manufacturing can be changed during usage of the near-field communication module 110. Accordingly, at a first time, the list of records in the message 117 stored by the near-field communication module 110 may be in a first order. When the list of records is in the first order, a first operation associated with the record that is first in the list will be executed by the external device 140. At a second time, the message 117 stored by the near-field communication module may be overwritten so that the list of records is in a second order. When the list of records is in the second order, a second operation associated with a record that is first in the list and different from the first operation will be executed by the external device 140.

In more detail, the control unit 120 is configured to configure the list of records in the message 117 to define an order of the first record 117a and the second record 117b in the list. The control unit 120 configures the list of records in response to detecting a predetermined state of the device 100. The order of the records in the list is based on the specific predetermined state detected. For example, in response to detecting a first predetermined state of the device 100, the control unit 120 configures the list so that the first record 117a is first in the list, in other words so that the first record 117a is at the top of the list. Then, when the control unit 120 detects a second predetermined state of the device, the control unit 120 configures the list so that the second record 117b is first in the list, in other words so that the second record 117b is at the top of the list. Once the control unit 120 has configured the list of records, the message 117 comprising the configured list of records is stored in the near-field communication module 110, thereby dynamically overwriting the message 117 previously stored in the near-field communication module 110.

The first pre-determined state may be an advertising state. In the advertising state, the device 100 is in a mode such that the external device 140, or any other suitable device, can communicatively couple with the device 100. For example, when the device 100 is in the advertising state, the communication module 130 broadcasts advertising packets that enable the external device 140 to communicatively couple with the device 100 via the communication module 146 of the external device 140. The device 100 enters the advertising state when the communication module 130 is switched on or otherwise activated. The communication modules 130 and 146 may be Bluetooth modules or Bluetooth low energy modules. The advertising state may be a Bluetooth advertising state or a Bluetooth low energy advertising state.

When the control unit 120 detects the advertising state of the device 100, the control unit 120 configures the list so that the first record 117a is at the top of the list. The first record 117a may be of a multipurpose internet mail extension media type. When the first record 117a is of a multipurpose internet mail extension media type, the first record 117a comprises data that enables the external device 140 to communicatively couple with the device 100 when the external device 140 executes the first record 117a. For example, the first record 117a may comprise a Bluetooth address or a Bluetooth low energy address.

Thus, when a distance between the external device 140 and the near-field communication module 110 is below a threshold distance, the near-field communication module 110 sends the message 117 to the external device 140. Because the message is configured such that the first record 117a is first in the list of records, the external device 140 executes the first record 117a and communicatively couples (pairs) with the device 100.

The second predetermined state may be a communicatively coupled state, meaning that the device 100 and the external device 140 are communicatively coupled to each other via their respective communication modules 130 and 146. For example, when the device 100 automatically pairs with the external device 140, the device 100 leaves the advertising state and enters the communicatively coupled state. The communicatively coupled state may be a Bluetooth connection state or a Bluetooth low energy connection state.

Alternatively or additionally, the second predetermined state may be an off state, meaning that the communication module 130 is switched off or not activated.

When the control unit 120 detects the communicatively coupled state or the off state of the device 100, the control unit 120 configures the list of records so that the second record 117b is at the top of the list. The second record 117b may be of a uniform resource identifier type. The second record 117b may comprise data that enables the external device 135 to open an application or to open an internet browser and navigate to a website. For example, the second record 117b may comprise a uniform resource locator.

Therefore, when the distance between the external device 140 and the near-field communication module 110 is below a threshold distance, the near-field communication module 110 sends the message 117 to the external device 140. Because the message 117 is configured such that second record 117b is first in the list of records, the operating system software and/or application software 150 installed on the external device 140 executes the second record 117b. As a result of executing the second record 117b, the software 150 causes an internet browser to automatically open and navigate to a website associated with the uniform resource locator included in the second record 117b. Alternatively or additionally, as a result of executing the second record 117b, another application software may be launched.

The website or application launched in response to executing the second record 117b may enable a user to register the device 100. For example, the uniform resource locator included in the second record 117b may comprise a link to an account associated with the device 100. Once the device 100 is registered, the external device 140 may send a registration confirmation message to the device 100. In response to receiving the registration confirmation message, the control unit 120 is configured to initiate unlocking of the device 100 such that the device 100 is operable by a user. For example, when the device 100 is shipped after manufacturing, the device 100 may be in a locked state meaning that it cannot be operated by a user. After the device 100 receives the registration confirmation message, the control unit 120 configures the device 100 so that it can be operated by a user. In other words, the control unit unlocks the device 100 and the device 100 is now in an unlocked state.

Control unit 120 may be configured to encrypt error data entries before saving them to the error data log on near-field communication module 110.

In other examples, control unit 120 may filter error occurrences on device 100 to limit the number of error data entries to be stored on error data log 118 in view of limited size of non-volatile storage 116.

Figure 2A:
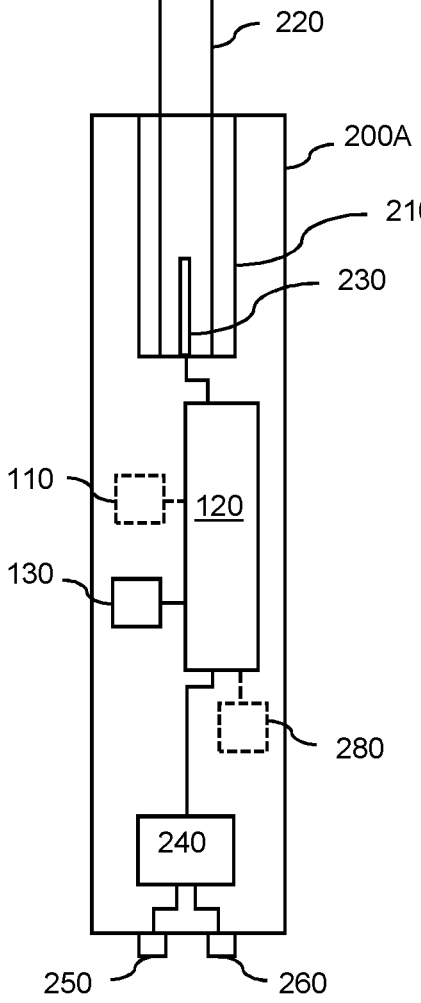
FIG. 2A illustrates an aerosol-generating device equipped with a near-field communication module for device diagnostics.
Figure 2B:
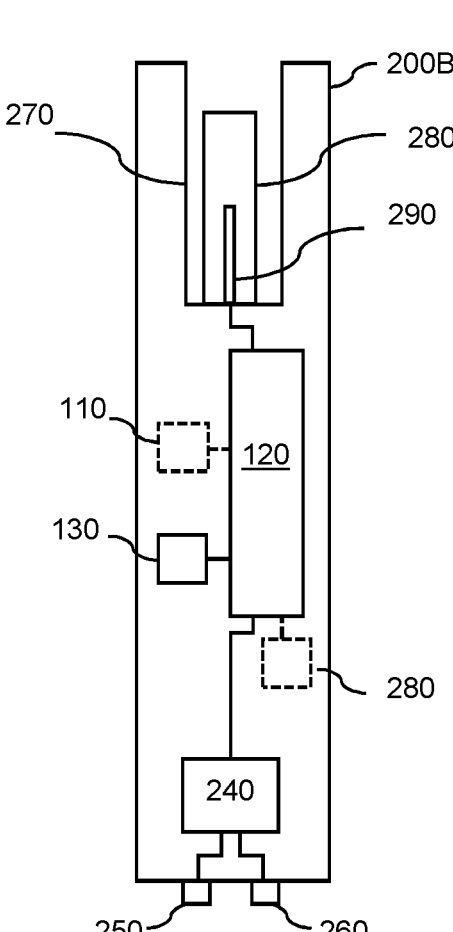
FIG. 2B illustrates an aerosol-generating device equipped with a near-field communication module for device diagnostics.

The system described with reference to FIGS. 1A and 1B may be implemented for an aerosol-generating device such as aerosol-generating device 200A illustrated in FIG. 2A or aerosol-generating device 200B illustrated in FIG. 2B. The system may also be also be implemented for a charging device associated with aerosol-generating devices such as charging device 300 illustrated in FIG. 3.

Referring to FIG. 2, the aerosol-generating device 200A is configured to receive an aerosol-generating article 220. Specifically, the aerosol-generating device 200A comprises a cavity 210 for receiving the aerosol-generating article 220. The aerosol-generating article 220 may comprise an aerosol forming substrate. The aerosol-forming substrate of the aerosol-generating article 220 may be a solid, such as a tobacco stick. The aerosol-generating device 200A further comprises a heating element 230. The heating element 230 is configured to heat the aerosol forming substrate to form an aerosol.

Aerosol-generating device 200B is configured to receive a cartridge 280. In particular, the aerosol-generating device 200B comprises a cavity 270 for receiving the cartridge 280. The cartridge 280 may comprise an aerosol-forming substrate. The aerosol-forming substrate of the cartridge 280 may be a liquid. The aerosol-generating device 200B further comprises a heating element 290. The heating element 290 is configured to heat the aerosol forming substrate to form an aerosol.

Preferably, the aerosol-generating device 200A and aerosol-generating device 200B each comprise a power supply configured to supply power to the respective heating elements 230 and 290. The power supply preferably comprises a power source, such as power source 240. Preferably, power source 240 is a battery, such as a lithium ion battery. As an alternative, power source 240 may be another form of charge storage device such as a capacitor. Power source 240 may require recharging. For example, power source 240 may have sufficient capacity to allow for the continuous generation of aerosol for a period of around six minutes or for a period that is a multiple of six minutes. In another example, power source 240 may have sufficient capacity to allow for a predetermined number of puffs or discrete activations of the heater assembly. Aerosol-generating device 200A and aerosol-generating device 200B may each comprise power contact 250 for recharging power supply 240. Power source 240 of aerosol-generating device 200A, 200B may be recharged using a charging device, such as charging device 300 illustrated in FIG. 3.

Power supply 240 may comprise control electronics. The control electronics may comprise a microcontroller. The microcontroller is preferably a programmable microcontroller. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

In examples, aerosol-generating device 200A, 200B comprises near-field communication module 110, drawn with dashed lines. In these examples, aerosol-generating device 200A, 200B corresponds to device 100 described above with reference to FIG. 1A. In these examples, control unit 120 is configured, as described above referring to FIG. 1A, to receive an indication of an error occurrence in aerosol-generating device 200A, 200B and update an error data log maintained in non-volatile memory on near-field communication module 110.

In other examples aerosol-generating device 200A, 200B does not comprise a near-field communication module, while charging device 300, associated with aerosol-generating device 200A, 200B, comprises near-field communication module 110, which stores error data entries from both aerosol-generating device 200A, 200B and charging device 300. Charging device 300 will be described in further detail blow with reference to FIG. 3. In these examples, aerosol-generating device 200A, 200B comprises memory 280, which may be volatile memory or non-volatile memory. In these examples, control unit 120 is configured to receive an indication of an error occurrence in aerosol-generating device 200A, 200B and to save an error data entry associated with the error occurrence in memory 280. Error data entries stored in memory 280 may be retrieved from aerosol-generating device 200A, 200B to charging device 300 when aerosol-generating device 200A, 200B is inserted in charging device 300. When being regularly used, aerosol-generating device 200A, 200B is re-charged frequently in charging device 300. Therefore, retrieving error data entries from aerosol-generating device 200A, 200B to charging device 300 allows gathering reliable diagnostic information.

In still other examples, both aerosol-generating device 200A, 200B and associated charging device 300 comprise near-field communication module 110. In such examples, aerosol-generating device 200A, 200B does not contain memory 280 but store error data entries to near-field communication module 110 as described above. Error data entries stored in near-field communication module 110 on aerosol-generating device 200A, 200B may be retrieved to charging device 300 when aerosol-generating device 200A, 200B is inserted in charging device 300. Hence, both aerosol-generating device 200A, 200B and associated charging device 300 provide fail-safe error logs.

Figure 3:
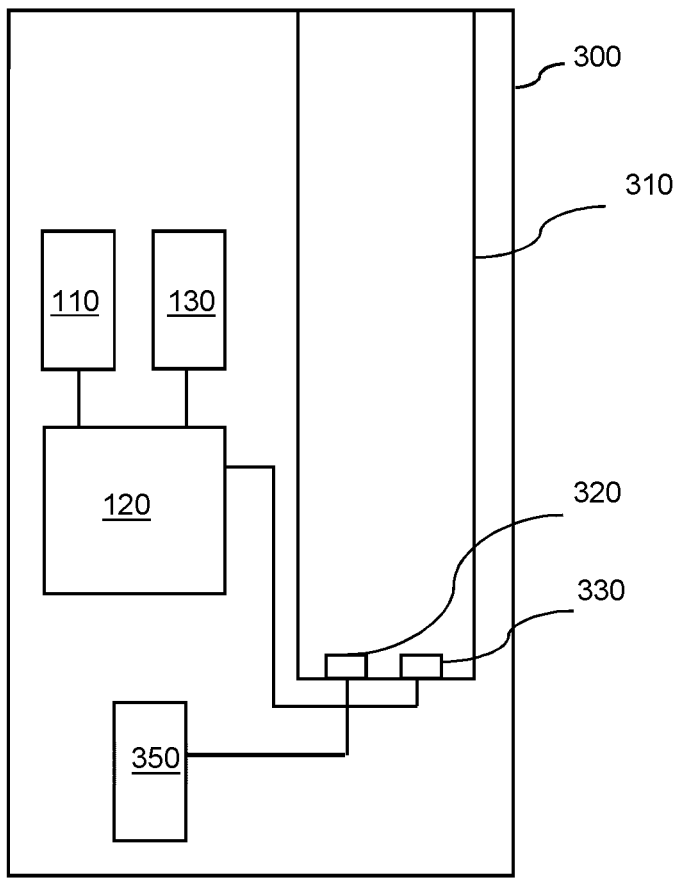
FIG. 3 illustrates a charging device equipped with a near-field communication module for device diagnostics.

FIG. 3 illustrates charging device 300 comprising near-field communication module 110 as described above with reference to FIG. 1A. The charging device 300 comprises a cavity 310 that is configured to receive an aerosol-generating device, such as aerosol-generating device 200A and aerosol-generating device 200B. Within the cavity 310 there may be a power contact 320 configured to contact with a corresponding power contact 250 of the aerosol-generating device. Specifically, when the aerosol-generating device 200A or the aerosol-generating device 200B is received within the cavity 310, the power contact 250 contacts with the power contact 320 so that the charging device 300 can charge the rechargeable power source 240 of the aerosol-generating device 200A or the aerosol-generating device 200B.

In addition, the charging device 300 and the aerosol-generating device 200A or 200B may be configured to exchange data with each other. For example, the charging device 300 and the aerosol-generating device 200A or 200B may be configured to exchange data with each other wirelessly. For example, the charging device 300 and the aerosol-generating device 200A or 200B may exchange data via their respective communication modules 130.

Additionally or alternatively, the charging device 300 may comprise a data contact interface 330 for communicating with the aerosol-generating device 200A and the aerosol-generating device 200B. Referring back to FIGS. 2A and 2B, the aerosol-generating device 200A and the aerosol-generating device 200B are illustrated as comprising data contact interface 260. When the aerosol-generating device 200A or the aerosol-generating device 200B is received within the cavity 310, the data contact interface 330 contacts with the data contact interface 260 and data may be exchanged. For example, the aerosol-generating device 200A or 200B may communicate data, such as the usage data, to the charging device 300 via the data contact interfaces 260 and 330.

In particular, charging device 300 may receive error data entries stored in memory 280 via communication over contact interfaces 330 and 260. Aerosol-generating device 200A or 200B may also communicate usage data to the charging device 300 via the data contact interfaces 260 and 330.

After receiving error data entries from aerosol-generating device 200A, 200B, control unit 120 of charging device 300 is configured to store the received error data entries to error data log 118 maintained in non-volatile memory 116, along with previously received error data entries from other aerosol-generating devices and error data entries relating to error occurrences in charging device 300 itself. In examples, only error data entries not presently stored on near-field communication module 110 are written to error data log 116, so that storage space is saved. Errors retrieved from a received aerosol-generating device 200 may be associated with a product code and a serial number of the particular aerosol-generating device 200A, 200B, so that, when charging device 300 receives different aerosol-generating devices, errors may be tracked to the specific aerosol-generating device 200A, 200B on which the error occurred. Hence, charging device 300 gathers all errors from charging device 300 itself and from aerosol-generating devices inserted into charging device 300.

Figure 4:
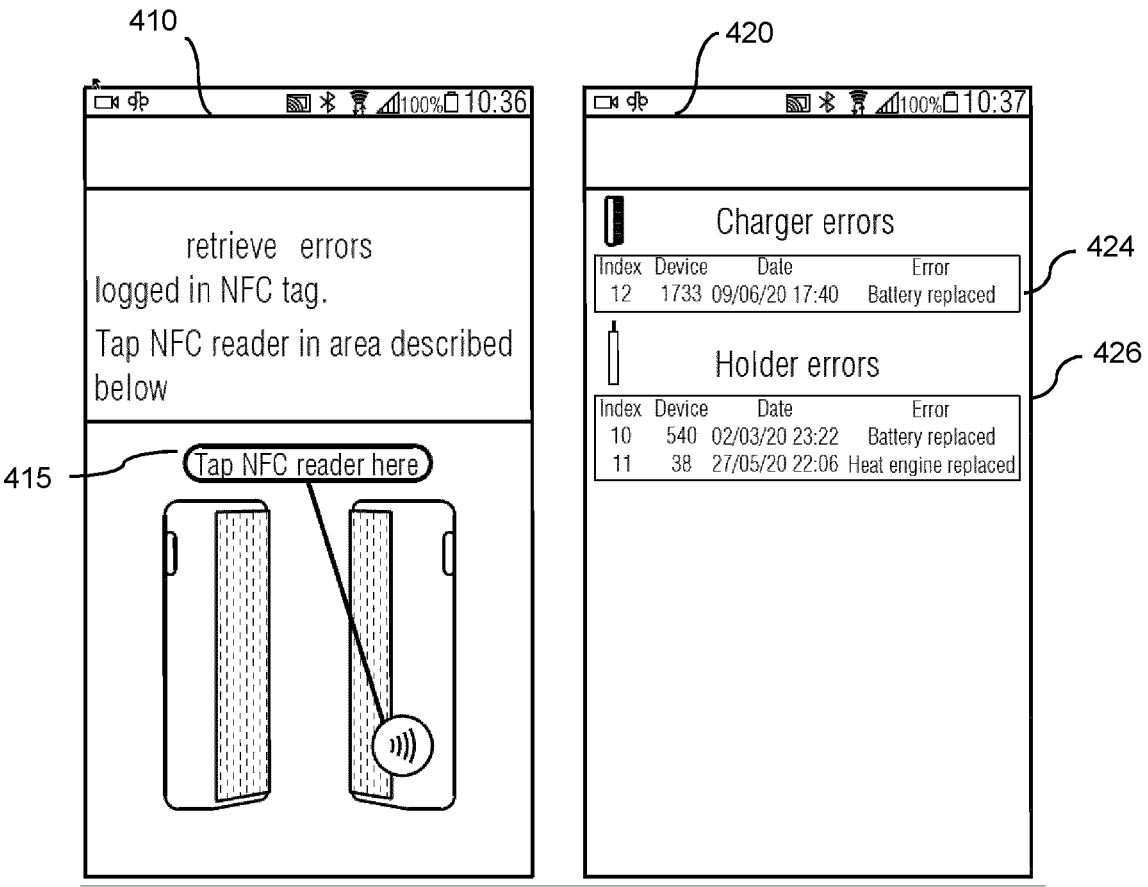
FIG. 4 illustrates a graphical user interface for device diagnostics.

The present disclosure further describes user interfaces for recovering errors from near-field communication modules of aerosol-generating devices or charging devices associated with aerosol-generating devices. FIG. 4 illustrates user interfaces 410 and 420 provided on an external device such as external device 140 discussed with reference to FIG. 1A. User interface 410 displays instruction 415 instructing a user to move the external device in proximity to a device, such as aerosol-generating device or a charging device, by tapping the near-field communication reader to the area of the device as indicated.

The application may then configure the external device to retrieve the error data log from non-volatile memory of the near-field communication module of the device. Optionally, the application then configures the external device to decrypt the error data log and to decode the error data entries. The external device may be configured to sort the decoded error data entries. Then, the external device may render user interface 420. User interface 420 displays list 424 of charger errors relating to errors that have occurred on charging devices as described above with reference to FIG. 3. List 424 may be sorted according to an error code.

User interface 420 further displays list 426 of holder errors that relate to errors of aerosol-generating devices 200A and 200B, that have been retrieved from aerosol-generating devices 200A and 200B by charging device 300 as explained above. List 426 may be sorted by grouping errors according to serial number of the aerosol-generating devices 200A and 200B on which the particular error has occurred.

Figure 5:
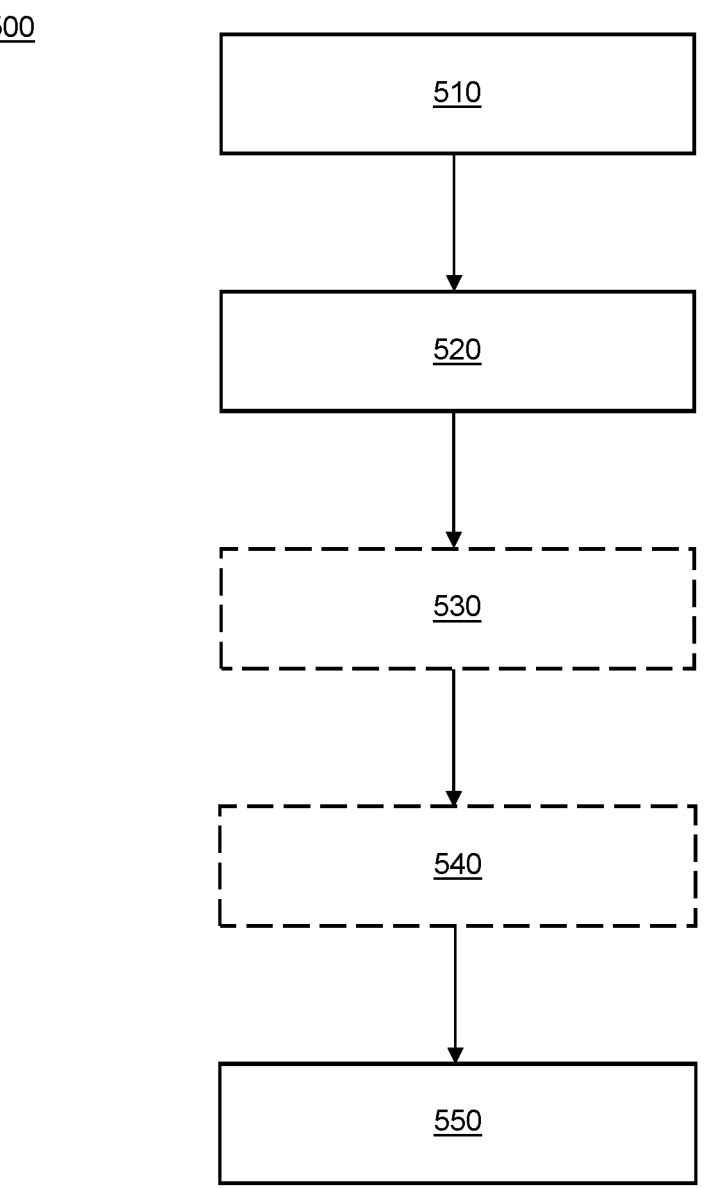
FIG. 5 illustrates a flowchart of a method for device diagnostics.

FIG. 5 illustrates a flow chart of method 500 for maintaining error data on a device such as devices 200A, 200B described above with reference to FIGS. 2A and 2B, or device 300 described above with reference to FIG. 3. Method 500 comprises step 510 of monitoring the device for error occurrences. For example, monitoring the device may comprise monitoring for a plurality of predefined error conditions.

In response to receiving an indication of an error occurrence, method 500 further comprises step 520 of updating an error data log stored in non-volatile memory of a near-field communication module of the device by storing an error data entry associated to the error occurrence to the error data log. As described above, storing the error data entry to the error data log may comprise storing the error data entry in the error data log as described above, and, optionally, encrypting the error data entry.

When method 500 is performed by charging device 300 described above with reference to FIG. 3, method 500 may optionally comprise step 530 of receiving an associated aerosol-generating device for charging. In response to step 530, the charging device may, in step 540, retrieve an error data log associated to error occurrences on the aerosol-generating device. The error data log of the aerosol-generating device may be stored in volatile storage 280 as described above with reference to FIGS. 2A and 2B, and may be retrieved by employing communication between respective wireless communication modules 130, or by employing communication via data contact interface 330 and data contact interface 260. The retrieved error data log may be joined to the error data log maintained in the non-volatile memory of the near-field communication module on the charging device.

Method 500 may comprise step 550 of transmitting the error data log via near field communication to an external device in direct vicinity of the aerosol-generating device or the charging device, allowing the external device to retrieve the error data log even if, after a last updating of the non-volatile memory, the device has ceased function.

Figure 6:
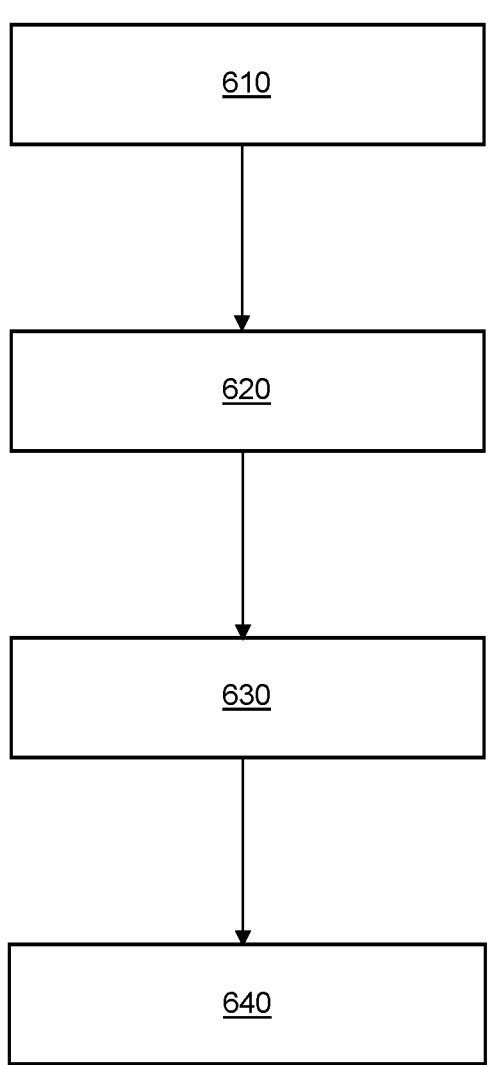
FIG. 6 illustrates a flowchart of a method for retrieving diagnostic data from a device.

FIG. 6 illustrates a flowchart of a method 600 for recovery of error data from an aerosol-generating device or a charging device associated with an aerosol-generating device, such as by employing external device 140 comprising a near-field communication reader Method 600 comprises step 610 of displaying, on a user interface of the external device, a prompt to move the external device in proximity to a device, such as by displaying instruction 415 in user interface 410. The application may then detect the presence of the near-field communication module of the device.

In response, in step 620, the application retrieves the error data log from the non-volatile memory of the detected near-field communication module.

In step 630, the application decodes the error data entries. Optionally, step 630 may comprise decrypting the error data entry as has been described in further detail above.

Method 600 further comprises step 640 of displaying the recovered error data entries. Displaying the error data entries may comprise sorting the error data entries, for example by product type and device serial number. Step 640 may comprise rendering graphical user interfaces 410 and 420 as has been described above with reference to FIG. 4.

Some or all of the method steps described above with regard to FIGS. 5 and 6 may be implemented by a computer in that they are executed by (or using) a processor, a microprocessor, an electronic circuit or processing circuitry. For example, the implementation can be performed using a non-transitory storage medium such as a computer-readable storage medium. Such computer-readable media can be any available media that can be accessed by a general-purpose or special-purpose computer system.

Generally, examples described herein can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an example, a storage medium (or a data carrier, or a computer-readable medium) comprises, stored thereon, the computer program or the computer-executable instructions for performing one of the methods described herein when it is performed by a processor. In a further example, an apparatus comprises one or more processors and the storage medium mentioned above.

In a further example, an apparatus comprises means, for example processing circuitry like e.g. a processor communicating with a memory, the means being configured to, or adapted to, perform one of the methods described herein.

A further example comprises a computer having installed thereon the computer program or instructions for performing one of the methods described herein.

The specific embodiments and examples described above illustrate but do not limit the invention. It is to be understood that other embodiments of the invention may be made and the specific embodiments and examples described herein are not exhaustive.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

The invention claimed is:

1. A system, comprising:
an aerosol-generating device and/or a charging device associated with an aerosol-generating device;
a near-field communication module comprising a non-volatile memory; and
a controller configured to receive an indication of an error occurrence and to update an error data log stored in the nonvolatile memory by storing an error data entry associated with the error occurrence to the error data log,
wherein the error data entry is configured to be read by an external device even when the aerosol-generating device and/or the charging device comprising the near-field communication module is not powered.

2. The system according to claim 1,
wherein the near-field communication module is a near-field communication tag,
wherein the system further comprises a near-field communication module system comprising a near-field communication controller,
wherein the controller configured to update the error data log is further configured to transmit the error data entry to the near-field communication controller, and
wherein the near-field communication controller is configured to store the received error data entry to the error data log.

3. The system according to claim 1, wherein the nonvolatile memory comprises a near-field communication data exchange format record configured to include at least one of a Uniform Resource Locator and a near-field communication data exchange format record configured to include configuration data for near-field communication low-energy pairing.

4. The system according to claim 1, wherein storing the error data entry to the error data log comprises storing the error data entry in association with an error type and a timestamp.

5. The system according to claim 1, wherein storing the error data entry to the error data log comprises storing the error data entry in association with identifying information of the aerosol-generating device or the charging device.

6. The system according to claim 1, wherein a device comprising the near-field communication module is the aerosol-generating device or the charging device associated with an aerosol-generating device.

7. The system according to claim 1, wherein the charging device comprises the near-field communication module and the controller.

8. The system according to claim 7, wherein the controller is further configured to, in response to the charging device being connected to the associated aerosol-generating device, retrieve an error data log associated with at least one error occurrence of the aerosol-generating device, and to update the error data log with the error data log associated to at least one error occurrence of the aerosol-generating device.

9. The system according to claim 7,
wherein the system further comprises the aerosol-generating device, and
wherein the aerosol-generating device is configured to detect at least one error occurrence on the aerosol-generating device and to update the error data log associated to at least one error occurrence of the aerosol-generating device stored in volatile memory by storing an error data entry associated with the at least one error occurrence on the aerosol-generating device to the error data log associated to the at least one error occurrence of the aerosol-generating device.

10. The system according to claim 1, wherein the controller is further configured to encrypt the error data log.

11. The system according to claim 7, wherein the controller is further configured to receive the indication of an error occurrence by being configured to monitor the charging device for a plurality of charging device error conditions.

12. The system according to claim 11, wherein the plurality of charging device error conditions comprises a battery replacement error.

13. The system according to claim 1, wherein the aerosol-generating device comprises the near-field communication module and the controller.

14. The system according to claim 1,
wherein the error data log is stored in the nonvolatile memory as raw data, and/or
wherein the error data log is stored in the nonvolatile memory as a ring buffer.

15. A method for maintaining error data on an aerosol-generating device and/or a charging device associated with an aerosol-generating device, the method comprising:
monitoring the aerosol-generating device and/or the charging device for error occurrences;
in response to an error occurrence, updating an error data log stored in nonvolatile memory of a near-field communication module of the aerosol-generating device and/or the charging device by storing an error data entry associated to the error occurrence to the error data log; and
transmitting, via near-field communication, the error data log to an external device for diagnostics.

16. The method according to claim 15, wherein the updating the error data log comprises transmitting the error data entry to a near-field communication controller for storing the received error data entry to the error data log.

17. The method according to claim 15, wherein the monitoring the aerosol-generating device and/or the charging device for error occurrences comprises monitoring the device for error occurrences for a plurality of error conditions.

18. The method according to claim 15, further comprising, in response to the charging device being connected to the associated aerosol-generating device, retrieving an error data log associated with at least one error occurrence of the aerosol-generating device, and updating the error data log with the error data log associated to at least one error occurrence of the aerosol-generating device.

19. The method according to claim 15, further comprising encrypting the error data log.

20. A method for recovery of error data from an aerosol-generating device and/or a charging device associated with an aerosol-generating device, the method comprising:
displaying, on a user interface of an external device, a prompt to move the external device in proximity to the aerosol-generating device and/or the charging device;
in response to detecting that the external device is in proximity to the aerosol-generating device or the charging device, retrieving, via near-field communication, an error data log from nonvolatile memory of a near-field communication module of the aerosol-generating device and/or the charging device; and
displaying error data entries from the error data log on the user interface.

21. The method according to claim 20, wherein the retrieving the error data log comprises decoding the error data entries from the error data log.

22. The method according to claim 20, further comprising decrypting the error data entries.

23. The method according to claim 20,
further comprising sorting the error data entries,
wherein the displaying the error data entries comprises displaying a sorted list of error data entries.

* * * * *